Patented Nov. 7, 1933

1,934,005

UNITED STATES PATENT OFFICE 1,934,005

METHOD OF PREPARING STABLE AQUEOUS EMULSIONS OF LECITHIN AND OIL

Bruno Rewald, Hamburg, Germany, assignor to Hanseatische Muhlenwerke Aktiengesellschaft, Hamburg, Germany, a joint stock company of Germany No Drawing. Application January 28, 1931, Serial No. 511,935, and in Germany May 24, 1930

5 Claims. (Cl. 252—6)

Lecithin is a substance which shows the properties of swelling slowly in water and of dissolving in oil. From such oil solutions, however, lecithin separates out with extreme rapidity. Hence, hitherto, only with extreme difficulty could stable emulsions of water with a large content of lecithin and more or less oil be successfully obtained. Stable emulsions are necessary for various technical purposes, and these, according to the present invention can be prepared with use of vegetable lecithin such as soya bean lecithin. These difficulties were apparent particularly in the greasing of leather with emulsions of water, oil and lecithin, and in the various applications in the textile industry where it is a case of treating the fibres or fabrics obtained therefrom with water-soluble materials. If, for this purpose, the aqueous emulsions of lecithin containing oil or of lecithin and oil are used a very rapid separation takes place. To render such emulsions permanent which, for the most part, is very essential, use is made of additions of alkalies, soaps or sulphonated oils, which is fundamentally undesirable since, in this manner just the advantageous properties which are obtainable with the lecithin-oil emulsions are counteracted. Further, such foreign additions are frequently disadvantageous; the leather industry, for example, will only tolerate wholly neutral emulsions which contain no free or combined acids.

Also with the use of lecithin in the production of food stuffs, for example, margarine and baked goods, similar difficulties arise, since it is extremely difficult to distribute vegetable lecithin containing oil, which is a smooth, wax-like mass, uniformly in the aqueous fat emulsion of margarine or in the dough produced from meal or flour and water.

I have now found that stable emulsions of water and oil-containing lecithin also with addition of further quantities of oil may be obtained when the lecithin is mixed with comparatively very small quantities of benzyl alcohol and then, if desired after addition of further quantities of oil, emulsified in water. In this way stable emulsions are obtained which may be employed for many technical purposes. Also other alcohols, their derivatives and substitution products, for example glycol, can be used for the same purpose.

For carrying out the process the procedure may, for example, be as follows:

1. 30 parts of vegetable lecithin, obtained by extraction of soya bean, with an oil content of about 30% are mixed with 10 parts of benzyl alcohol in the cold, whereupon 60 parts of linseed oil are admixed. 400 parts of water are added thereto and strongly agitated therewith, whereby a stable emulsion is obtained which is permanent for several days.

2. A mixture of 30 parts of soya lecithin with an oil content of about 30%, 8 parts of benzyl alcohol, 4 parts of triethanolamine and 58 parts of train oil is produced and the mixture is dispersed in 900 parts of water, whereby immediately a stable emulsion is obtained.

3. For the production of margarine or for the improvement of dough products a mixture of 90 parts of soya lecithin with an oil content of about 30% and 10 parts of benzyl alcohol is produced; this is dispersed in the desired proportions in the watery fat emulsion of the margarine or in the dough worked up from meal or flour and water.

If according to statements made in the literature on the subject, lecithin is regarded as an emulsifier, its emulsification properties are nevertheless very imperfect because very considerable difficulties are involved in obtaining a permanent emulsion for example from water, oil and lecithin. A rapid separation of three materials always takes place. It is precisely for this reason that it is so important to obtain by the addition of small quantities of benzyl alcohol stable aqueous emulsions of lecithin and oil.

The use of benzyl alcohol (which by itself is not soluble in water) for the production of cleaning, fat liquoring and emulsification materials for liquid and solid materials insoluble in water has already been suggested in the British patent specification No. 266,746. In this connection benzyl alcohol was employed together with alkali salts of fatty acids, sulpho-fatty acids, naphthenic acids, the sulphonated, aromatic or hydro-aromatic hydrocarbons, their derivatives or corresponding acids, so that it could not be foreseen that a benzyl alcohol addition alone is suitable for efficiently assisting the formation of emulsions from a mixture comprising water, oil and lecithin.

I claim:—

1. In the production of stable soap-free aqueous emulsions of lecithin, the step of incorporating benzyl alcohol into the components of the emulsion.

2. Method of preparing stable soap-free aqueous emulsions of lecithin and oil comprising producing a mixture of lecithin and oil, adding to said mixture a proportion of benzyl alcohol and dispersing said mixture uniformly in water.

3. Method for the production of stable emulsions containing lecithin, comprising the steps of producing a soap-free mixture of lecithin and oil, adding to said mixture benzyl alcohol and then a further proportion of oil and dispersing said ultimate mixture in water.

4. Method of preparing stable emulsions containing lecithin, comprising the steps of producing a mixture of 30 parts of lecithin having an oil content of 30%, approximately 60 parts of oil, adding to said mixture approximately 10 parts of benzyl alcohol and emulsifying said ultimate mixture in at least 300 parts of water.

5. An oil-in-water emulsion containing lecithin as the essential emulsifying agent, and containing an amount of benzyl alcohol which is only a fraction of the amount of said lecithin.

BRUNO REWALD.